United States Patent
Mayer et al.

(10) Patent No.: US 11,600,012 B2
(45) Date of Patent: Mar. 7, 2023

(54) DISPLAY OF A VIRTUAL OBJECT LINKED TO A REAL OBJECT IN AN AUGMENTED REALITY DISPLAY DEVICE

(71) Applicants: SIEMENS AKTIENGESELLSCHAFT, Munich (DE); SIEMENS HEALTHCARE GMBH, Erlangen (DE)

(72) Inventors: Hermann Georg Mayer, Prien am Chiemsee (DE); Hans Schweizer, Plattling (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 26 days.

(21) Appl. No.: 16/139,551

(22) Filed: Sep. 24, 2018

(65) Prior Publication Data
US 2019/0096084 A1 Mar. 28, 2019

(30) Foreign Application Priority Data
Sep. 25, 2017 (DE) .................... 10 2017 216 953.2

(51) Int. Cl.
*G06T 7/70* (2017.01)
*G06T 7/277* (2017.01)
(Continued)

(52) U.S. Cl.
CPC .............. *G06T 7/70* (2017.01); *G06T 7/0002* (2013.01); *G06T 7/277* (2017.01); *G06T 19/006* (2013.01);
(Continued)

(58) Field of Classification Search
CPC ......... G06T 7/70; G06T 7/277; G06T 7/0002; G06T 19/006; G06T 2207/10016; G06T 2207/10024
See application file for complete search history.

(56) References Cited

U.S. PATENT DOCUMENTS

| 8,147,503 B2* | 4/2012 | Zhao | G06K 9/3241 |
| | | | 382/128 |
| 2009/0195538 A1* | 8/2009 | Ryu | G06T 19/006 |
| | | | 345/419 |

(Continued)

OTHER PUBLICATIONS

Sielhorst T. et al.: "Advanced Medical Displays: A Literature Review of Augmendted Reality"; Journal of Display Technology; IEEE; New York, US; Bd. 4; Nr. 4; pp. 451-467; XP011237912; ISSN: 1551-319X, DOI:10.1109/JDT.2008.2001575; 2008.

*Primary Examiner* — Srilakshmi K Kumar
*Assistant Examiner* — Umair Ahsan
(74) *Attorney, Agent, or Firm* — Schmeiser, Olsen & Watts LLP (57) ABSTRACT

A method for determining the position of a real object and displaying a virtual object linked to the real object in an augmented reality display device is provided. For this purpose, a tracking system is used to detect a position of the real object) at different consecutive measurement times and in each case to calculate an estimated position for the measurement times. A reliability value is determined on the basis of the detected position of the real object and of the estimated position of the real object and shown in the augmented reality display device. The present method furthermore discloses a corresponding augmented reality system having an augmented reality display device for displaying a real object and a virtual object linked to the real object).

13 Claims, 7 Drawing Sheets

(51) Int. Cl.
*G06T 7/00* (2017.01)
*G06T 19/00* (2011.01)
(52) U.S. Cl.
CPC ............... *G06T 2207/10016* (2013.01); *G06T 2207/10024* (2013.01)

(56) References Cited

U.S. PATENT DOCUMENTS

| | | | |
|---|---|---|---|
| 2011/0110557 A1* | 5/2011 | Clark | G01C 11/06 |
| | | | 382/103 |
| 2014/0028714 A1* | 1/2014 | Keating | G06K 9/00671 |
| | | | 345/633 |
| 2015/0169947 A1* | 6/2015 | Kawaguchi | G01S 5/163 |
| | | | 382/103 |
| 2017/0004653 A1* | 1/2017 | Takemoto | G02B 27/017 |
| 2017/0011555 A1* | 1/2017 | Li | G06T 1/60 |
| 2017/0124713 A1* | 5/2017 | Jurgenson | G06T 7/246 |
| 2017/0221272 A1* | 8/2017 | Li | G06T 7/248 |

* cited by examiner

DISPLAY OF A VIRTUAL OBJECT LINKED TO A REAL OBJECT IN AN AUGMENTED REALITY DISPLAY DEVICE

CROSS-REFERENCE TO RELATED APPLICATIONS

This application claims priority to German application No. 10 2017 216 953.2 having a filing date of Sep. 25, 2017 the entire contents of which are hereby incorporated by reference.

FIELD OF TECHNOLOGY

The following relates to a method for determining the position of a real object and displaying a virtual object linked to the real object in an augmented reality display device (hereinafter also "AR display device") of an augmented reality system (hereinafter also "AR system"). The following furthermore relates to such an AR system having a corresponding AR display device.

BACKGROUND

In an augmented reality application (augmented reality is generally and therefore likewise also abbreviated to "AR" hereinafter), real objects are overlaid with virtual data (virtual objects) and depicted in a display. The visual depiction of the overlaid data may in this case be performed for example via a screen or data glasses. In order to link the overlaid data as exactly as possible with a real object and in order thereby to achieve a degree of immersion that is as high as possible and that gives the impression of an immersion in virtual reality that is close to reality, it is important to determine the exact position of the real object in space. In the case of dynamic displays, the position of the real object therefore has to be constantly determined and updated, for example. This object tracking is also often called "tracking". A camera system is usually used for tracking.

Such AR systems are already used relatively often in modern computer games. Meanwhile, there are additionally also scientific applications or applications in the industrial sector. It would also be possible to consider use in the medical sector, for example in order, during an operation, to provide the surgeon with additional information regarding his tool, for example a catheter or scalpel, and/or in order to virtually display the position of the tool or of a tool part within the body.

A problem with determining the position of the real object as described above may arise if the object is temporarily concealed. Such concealment may occur for example during an operation if the real object to be tracked is concealed by surrounding tissue or by the constricted situation during an operation, and is thus detected incorrectly, or not at all, by the camera system. As a result, it is no longer possible to overlay the real object with virtual data or the virtual data may be displayed at an incorrect position in space. This would reduce the degree of immersion and, in certain applications, such as for example in the case of an operation, may be extremely unfavorable. In the case of such an application, the user should be able to rely very precisely on the display in the AR application.

SUMMARY

An aspect relates to an improved method and an augmented reality system that addresses the abovementioned problem.

The method according to embodiments of the invention for determining the position of a real object and displaying a virtual object linked to the real object in an AR display device, for example glasses or a screen, uses a tracking system to detect a position of the real object at different consecutive measurement times, preferably in measurements repeated at regular time intervals. In each case an estimated position of the real object is additionally calculated for these measurement times. A reliability value (also called plausibility value) is determined on the basis of the detected position and of the estimated position (respectively assigned to the detected position by the measurement time) of the real object and shown in the AR display device.

This reliability value may in this case be determined through a comparison of the detected position and of the associated estimated position of the real object at the corresponding measurement times. It may thus indirectly express to what extent these two positions correspond in space.

A reliability value ZW in % could, to this end, be calculated as follows in a simple case, for example:

$$ZW=100\%-100\%\cdot(F_{Max}/D)$$

D is in this case the distance between the estimated position and the detected position, and $F_{Max}$ is the maximum error that is in this case able to be defined depending on the application that is displayed in the AR display device. Any desired metric (distance function) may be used for the distance D and the maximum error $F_{Max}$ in this case, as long as the same metric is used for both.

It is assumed here that the greater the correspondence between the detected and estimated position of the real object, the greater also the probability that the detected position of the real object corresponds to the actual position of the real object.

If this correspondence is very high, then the degree of immersion is also very high, since the virtual object is linked to the real object indirectly by the detected position of the real object. If the actual position of the real object then deviates greatly from the detected position of the real object, then the virtual object also deviates greatly from the position of the real object. This then in turn leads to a lower degree of immersion for a user of the AR display device.

It is thus taken into account here that, when tracking as well, even when detection is successful, measurement inaccuracies and measurement errors may occur. On the other hand, as mentioned at the outset, a high probability of the position of the virtual object corresponding to the actual position of the real object is important in many applications. By calculating the reliability value, the reliability of the position, detected by the tracking system, of the real object is now indirectly able to be checked or at least estimated with the aid of the estimated position of the real object.

This checking of the detected position of the real object may advantageously take place virtually continuously and be shown permanently in the display of the AR display device using the reliability value or plausibility value. The user is thus himself able to decide to what extent he wishes to trust the position of the virtual object or the position, detected by the tracking system, of the real object.

The augmented reality system according to embodiments of the invention first of all has an augmented reality display device for displaying a real object and a virtual object linked to the real object.

Furthermore, the augmented reality system comprises a computer unit that respectively calculates an estimated position of the real object at different consecutive measurement times.

In addition, it comprises an evaluation unit that determines a reliability value or plausibility value on the basis of the estimated position and of a position detected by a tracking system, and ensures that the reliability value is shown in the augmented reality display device. To this end, the evaluation unit may for example generate suitable control commands for the augmented reality display device and output them to the latter (for example via an interface).

The tracking system may in this case be connected to the AR display device according to embodiments of the invention by way of an interface, but it may also already be included in the AR display device.

A large number of the abovementioned components of the computer unit, in particular the evaluation unit and a unit for calculating the estimated position of the real object, may be implemented wholly or partly in the form of software modules in a processor of a corresponding computer unit. A largely software-based implementation has the advantage that even computer units already previously being used are easily able to be upgraded by a software update in order to function in the manner according to embodiments of the invention. To this extent, the object is also achieved by a corresponding computer program product (non-transitory computer readable storage medium having instructions, which when executed by a processor, perform actions) having a computer program that is able to be loaded directly into a storage apparatus of a computer unit of an AR system, having program sections for executing all of the steps of the method according to embodiments of the invention when the program is executed in the control apparatus. Such a computer program product may, besides the computer program, possibly comprise additional component parts, such as for example documentation and/or additional components including hardware components, such as for example hardware keys (dongles etc.) for utilizing the software.

For transportation to the computer unit and/or for storage at or in the computer unit, it is possible to use a computer-readable medium, for example a memory stick, a hard disk or another transportable or fixedly built-in data carrier on which the program sections, able to be read and able to be executed by a computer unit of the AR system, of the computer program are stored. To this end, the computer unit may for example have one or more cooperating microprocessors or the like.

Further particularly advantageous refinements and developments of embodiments of the invention emerge from the dependent claims and from the following description, the dependent claims of one claim category also being able to be developed analogously to the dependent claims and description parts with respect to another claim category, and in particular individual features of different exemplary embodiments or variants also being able to be combined to form new exemplary embodiments or variants.

The reliability value already described may be shown in the AR display device in a great number of ways.

For example, to this end, one or more markers may preferably be used in the display of the AR display device.

In this case, a marker may correspond for example to a numerical value and for example express the reliability value in percent. A reliability value of 0% here would express the fact that the detected position and the estimated position of the real object lie very far apart from one another.

A reliability value of 100% would express the fact that the detected position corresponds to the estimated position of the real object.

As an alternative or in addition, however, the marker may also be depicted in color and/or using a symbol, such as for example a traffic light. By way of the respective traffic light status, it is able for example to be displayed whether a high (above a set comparison value/limit value) or low (below a set comparison value/limit value) reliability value is involved.

Also, as an alternative or in addition to the (indirect) showing of the reliability value, the virtual object may also preferably be shifted in the display of the AR display device. For this purpose, the virtual object is preferably shifted toward the detected position of the real object depending on the previously calculated reliability value.

For example, the virtual object may preferably only be moved at all toward the detected position of the real object when the reliability value lies above a defined limit value. This limit value is set depending on the application in which the AR system is used. However, the limit value may also correspond to the previously defined maximum error.

If the reliability value is smaller than the limit value, then the virtual object is not shifted in the direction of the detected position of the real object. Displaying of the virtual object in the AR display device is then interrupted, and tracking of the position of the real object and calculation of the estimated position of the real object start again. In addition, there may be a warning, for example including by way of being shown in the AR display device and/or by way of an acoustic signal.

In addition or as an alternative, the speed at which the virtual object is shifted toward the estimated position of the real object may also preferably be based on the reliability value or selected in a manner depending thereon. The higher the reliability value, the faster for example the virtual object may be shifted in the direction of the detected position of the real object in the display of the AR display device.

If the reliability value lies at 100%, this means, as already mentioned, that the estimated position corresponds to the detected position of the real object. The virtual object is then immediately shifted in the direction of the detected position of the real object and a high degree of immersion is present.

On the other hand, if the reliability value is very low (but for example still above the admissible limit value), the virtual object is then shifted only very slowly. In this case, the speed may for example be so slow that the virtual object in this case would not reach the detected position of the real object before the position of the real object is detected again at a subsequent next measurement time.

For the refinement of the virtual object as well, there are different possibilities depending on the specific application.

The virtual object may for example preferably be formed by a symbol in the display of the AR display device. This symbol may for example correspond to a cross that marks the tip of a real object, for example of a scalpel.

The virtual object may preferably also comprise a virtual depiction of the real object in the display of the AR display device. This virtual depiction may then for example form a colored marker of the real object depicted in the display of the AR device. It could for example depict a strain on the real object or the strain of the real object in color, which strain has been measured for example by way of a strain gage applied to the real object and transmitted to the AR display device. This may be beneficial in particular in the case of a scalpel, in order to display the load or the resistance to which the scalpel is subjected upon cutting.

Furthermore, the virtual object may preferably comprise an item of information that is connected to the real object. This item of information may correspond for example to a numerical value (for example to a value for a strain of a real object), or for example represent a penetration depth of the real object, to be tracked, into another object, for example the cut depth that has been produced with a scalpel.

In order inter alia to determine the estimated position, required to determine the reliability value, of the real object, there are likewise different possibilities.

For example, this may preferably be calculated with consideration to a number of motion parameters and/or error reduction methods.

In this case, at least one motion parameter is preferably based on kinematics of the real object and/or else of a guide structure that is coupled to the real object. The guide structure may in this case for example be a body part or a guide device. The body part may be for example an arm or the hand of a surgeon that is holding a real object, in this case for example a scalpel. The guide device could be for example an arm of a robot or another mechanism that guides surgical equipment, for example.

If the guide structure is for example the hand of a surgeon, then the kinematics may be described for example by a kinematic chain that takes into account the degree of freedom of the leg, of the upper body, of the arm and of the hand. If the arm is supported on a table, for example, then the range of the hand is much more restricted. The hand could in this case only move on an imaginary ball (that results from the movement of the wrist), which is in turn situated on an imaginary half ball starting from the table on which the elbow lies (and which results from the movement of the elbow).

The position of the real object is limited in space as a result of these known motion parameter values, and is then able to be calculated or estimated.

In order also to incorporate position and acceleration data of the real object into the calculation of the estimated position of the real object, a motion parameter is preferably also based on the dynamics of the real object and/or of the guide structure that is coupled to the real object. The dynamics may in this case for example be detected via additional sensors, such as for example acceleration sensors or Hall sensors, on the real object or on the guide structure.

However, the estimated position of the real object may also preferably be calculated using an error reduction method.

The error reduction method may preferably comprise a Kalman filter, that is to say it operates with such a filter. The Kalman filter in this case indirectly calculates estimated values for the position of the real object.

Particularly preferably, the kinematics and the dynamics of the real object and/or of the guide structure and the Kalman filter are taken into account for the calculated, estimated position of the real object.

Furthermore, there are also different possibilities for determining or for detecting the position of the real object in order that the estimated position, as described above, of the real object is then able to be compared with the detected position of the real object in the context of embodiments of the invention.

Preferably, as mentioned, a tracking system may be used to detect the position of the real object.

The tracking system may in this case comprise a camera, in particular an infrared camera, by way of which the position of the real object is able to be detected.

In addition, the tracking system, in particular the camera, preferably uses markers for this purpose, which markers are able to be connected to the real object or to the guide structure. These markers may be markers with a visual identification, which have a pattern known to the tracking system. To this end, the markers or the patterns may also be read at the beginning of the tracking. These markers are then easily able to be detected and thus tracked at the different subsequent measuring times.

If the real object is an object emitting IR radiation (infrared radiation, in particular heat radiation), for example a human hand, then this could also be detected very well without additional markers by way of an infrared camera due to its IR or heat radiation.

If the real object were to be an object not emitting enough heat itself, such as for example the arm of a surgical robot, then passive infrared markers, which may be applied to the arm of the surgical robot, may also be used to facilitate detection. Under some circumstances, this may also involve markers reflecting IR radiation, and the entire scene is irradiated with IR radiation from a suitable IR radiation source.

By using an infrared camera, it is thus possible, even when the real object is concealed by surrounding objects, to detect the position of the real object in spite of this.

A further advantage of the method according to embodiments of the invention is incidentally also the possibility of the virtual object being able to be displayed with certain reliability even if the object itself is temporarily not able to be detected, for example because the object and/or the markers temporarily disappear(s) or are/is concealed.

Namely, for example, if a good reliability value was achieved constantly at the preceding measurement times, which reliability value lies above a previously defined second limit value, then the virtual object may also be linked to the estimated position of the real object and shown in the display of the AR display device.

It is preferable for the second limit value consequently to lie above the previously defined and explained first limit value and for example to have at least a value of 80%.

BRIEF DESCRIPTION

Some of the embodiments will be described in detail, with references to the following Figures, wherein like designations denote like members, wherein.

DETAILED DESCRIPTION

Figure 1:
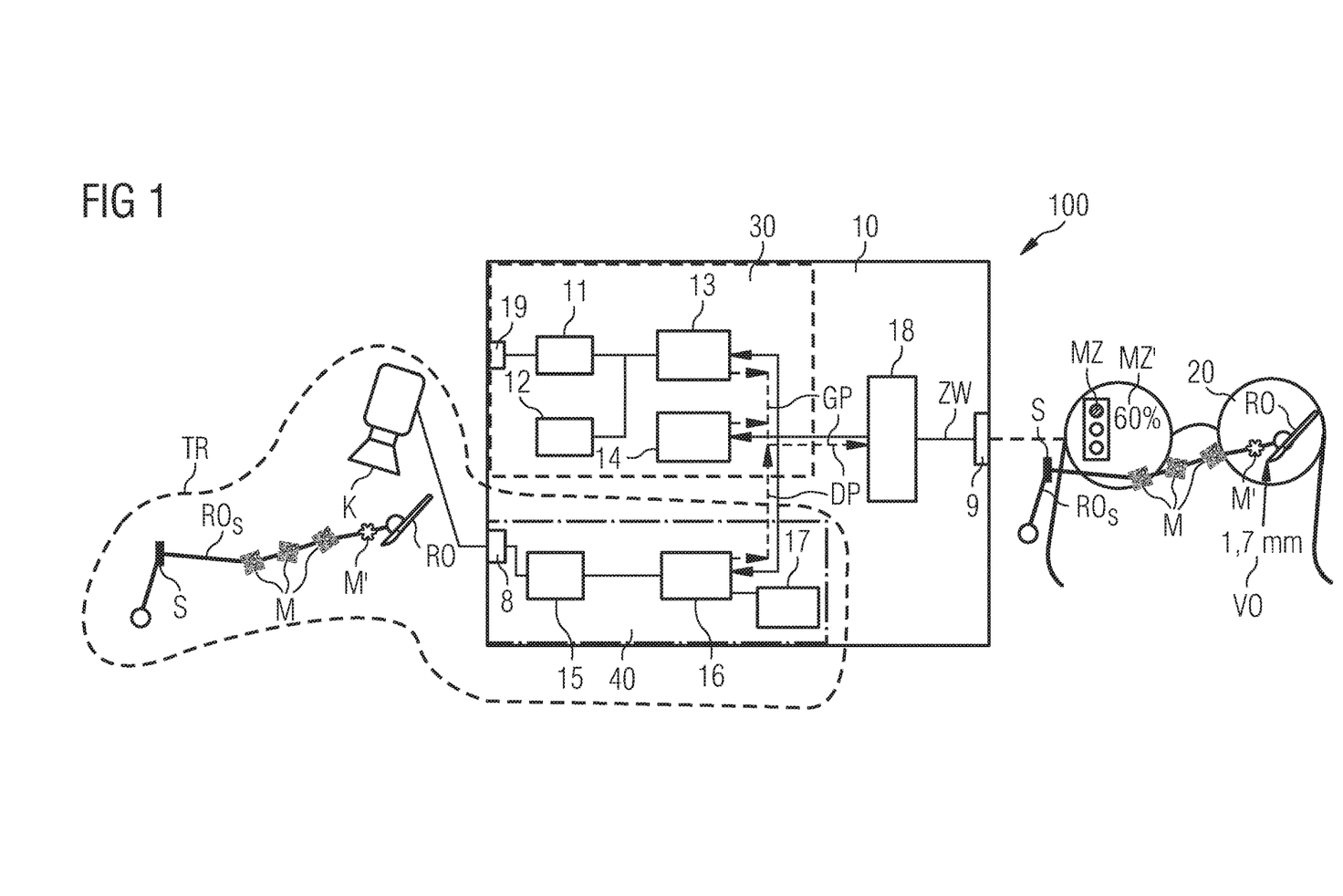
FIG. 1 schematically shows one exemplary embodiment of an AR system.

FIG. 1 schematically depicts an AR system 100, comprising a computer unit 10 and an AR display device 20 for showing a virtual object VO, which is linked to a real object RO, in a display of the AR display device 20.

In order to display the virtual object VO in the AR display device 20, here AR glasses 20, the position of a real object RO or of a guide structure ROS that is connected to the real object RO first of all has to be determined. In FIG. 1, the guide structure ROS corresponds to the arm of a surgical robot, and the real object RO corresponds to a scalpel guided by the arm ROS.

Figure 2:
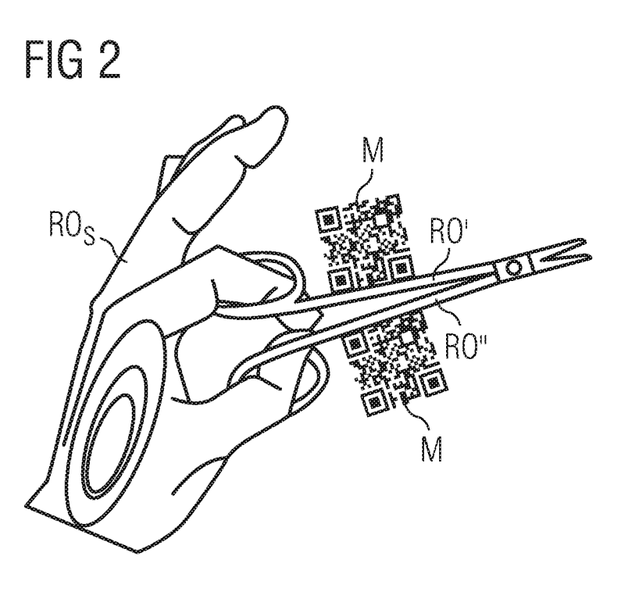
FIG. 2 schematically shows a depiction of a guide structure navigated by a real object on which optical markers are located.

In order to detect the position of the scalpel RO, the tracking system TR comprises a camera K, in particular an infrared camera, which acquires images of the real object RO. The camera K in this case also acquires the position of the arm of the surgical robot ROS using markers M, M' that are connected to the arm ROS. The markers M, M' are optical markers M, M'. In FIG. 1, by way of example, a plurality of markers M are marked with a visual identification such as a code, in this case a QR code, which is able to be detected by a camera that also operates in the visible light range, and an infrared marker M', which is able to be detected using an infrared-capable camera. This has the advantage that the infrared camera is able to detect the marker M' even when concealed, for example during an operation by tissue, blood etc. on the scalpel RO. If the real object RO is an object emitting IR radiation (infrared radiation, in particular heat radiation), such as for example the human hand $RO_S$ shown in FIG. 2, then this is able to be detected by way of the infrared-capable camera K even without additional markers M' on account of its IR or heat radiation. In the present exemplary embodiment, it is assumed that the camera K is able to operate both in the visible range and in the infrared range.

Furthermore, the markers M, M' may be used not only to detect the position of a real object RO, but also the functional state of the real object RO. If the real object RO consists of a plurality of partial objects RO', RO", such as for example the two limbs RO', RO" of the clamp in FIG. 2, then these partial objects RO', RO" are each provided with markers M, M'. The position of each individual partial object RO', RO" is then detected and the various positions may then be converted into a functional state of the entire real object RO.

To transfer the image data acquired by the camera K to the tracking system TR or to the AR display device 20, the camera K is connected to the computer unit 10 via an interface 8.

The image data acquired from the scalpel RO or from the arm ROS of the robot are evaluated by way of a position calculation unit 40 contained in the computer unit 10. For this purpose, the position calculation unit 40 contains an image data acquisition unit 15 and a position evaluation unit 16 connected thereto. The position evaluation unit 16 may for example be implemented in the form of image recognition or pattern recognition software in order to find the position of the markers and of the real object in the images. To calibrate the tracking system TR, an additional calibration unit 17 is connected to the position evaluation unit 16. The position evaluation unit 16 then outputs the detected position DP. As already described above, the detected position DP is mandatorily always associated with a certain amount of uncertainty that may be greater at times and smaller at times depending on the current situation.

Fundamentally, however, the modes of operation of tracking systems and methods are known to those skilled in the art and therefore do not need to be explained in detail here. A tracking system that is already present may in principle also be used in the context of embodiments of the invention.

However, in this case the computer unit 10 additionally comprises a validation apparatus 30 in order, parallel to the detection of a position of the real object RO, also to calculate an estimated position GP of the real object RO or of the guide structure ROS.

In order also to be able to take into account the dynamics of the real object RO for the estimated position GP, the computer unit 10 contains an additional data transmission interface 19. This transfers for example the position and acceleration data that are acquired by a sensor S that is applied to the real object RO to a sensor signal acquisition unit 11. The transmission of the sensor measurement values may—such as here—be carried out wirelessly for example, but could also be carried out in a wired manner.

In addition, the kinematics of the real object RO and of the guide structure ROS may also be taken into account for the calculation of the estimated position GP of the real object RO. To this end, the validation apparatus 30 contains an interface 12 via which additional data regarding the real object RO may be queried. The interface 12 may comprise a user interface, such that the user is always able to specify the current data. However, in addition or as an alternative, it may also comprise an interface to a memory in which data for a wide variety of objects are already stored. If the guide structure ROS is for example a human hand instead of the arm of a robot, as is shown in FIG. 1, then the degree of freedom of the arm may be stored here, for example, in order to determine the kinematics of the real object RO.

The motion parameter values are evaluated in an evaluation unit 13 that is connected to the sensor signal acquisition unit 11 and the interface 12. On the other hand, however, the computer unit 10 may also call on the position evaluation unit 16 and the positions, detected thereby, of the markers M to calculate the kinematic data.

The estimated position GP of the real object RO may also be calculated using a measurement error correction unit 14, contained in the validation apparatus 30, said measurement error correction unit being based on a Kalman filter. In this case, this indirectly calculates estimated values for the position of the real object RO.

The position DP, detected at a specific time using the position calculation unit 40, of the real object RO and the position GP, estimated for the same time (measurement time) in the validation apparatus 30, of the real object RO are in each case transferred to an evaluation unit 18 and evaluated there. To this end, the evaluation unit 18 calculates a reliability value ZW or plausibility value that expresses the extent to which the detected position DP deviates from the estimated position GP of the real object RO at the respective time. The evaluation unit 18, for this purpose, generates for example suitable control commands for the AR display device 20 and outputs these commands to it.

The validation apparatus 30 and the position calculation unit 40 and the evaluation unit 18 may each be implemented on a dedicated microprocessor. However, they may also be implemented in a manner combined with one another on a shared microprocessor.

The reliability value ZW output by the evaluation unit 18 is transferred via a wireless data transmission interface 9 to the AR glasses 20 and shown there.

The reliability value ZW or the plausibility value may in this case be shown in various ways.

As is able to be seen in FIG. 1, the display may take place by way of a marker MZ, here the symbol MZ of a traffic light, the traffic light status being used to display how plausible the currently depicted position of the virtual object VO in the display of the data glasses 20 is (for example green for high reliability, red for poor reliability).

However, as is likewise able to be seen in FIG. 1, the display may also take place using a marker MZ' in the form of a numerical value MZ'. The extent for example to which the estimated position GP corresponds to the detected position DP of the real object RO is here expressed directly as a percentage. In the case illustrated, the marker MZ' that is shown expresses the fact that the virtual object VO is depicted in the display of the AR glasses 20 with a probability of 60% of being at the correct position (here the scalpel RO).

In addition, the virtual object VO itself may also be displayed in the AR glasses 20. In FIG. 1, the virtual object VO corresponds to an item of information regarding the real object RO and respectively expresses the current cutting depth of the scalpel RO, for example into human skin. However, the virtual object VO could also, as already mentioned, comprise a symbol or else be another virtual depiction of the real object RO.

The virtual object VO is in this case connected indirectly to the actual position of the scalpel RO by the detected position DP of the scalpel RO. This too may be an indication that the reliability value ZW is sufficiently high. A further possibility for showing the reliability value ZW in the display of the AR display device 20 is namely that of shifting the virtual object VO, depending on the reliability value ZW, in the direction of the detected position DP of the real object RO in the display.

Figure 3:
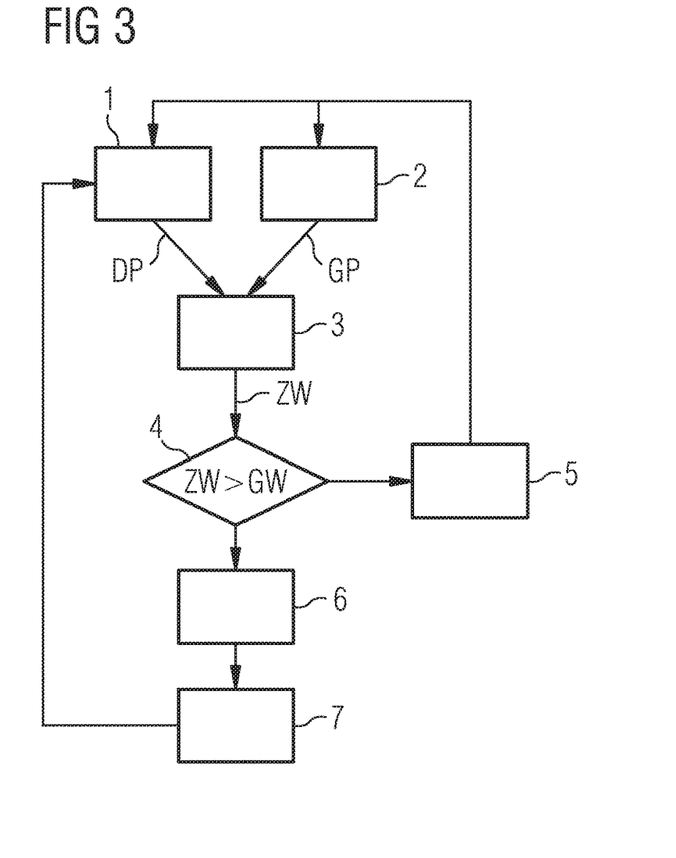
FIG. 3 shows a block diagram of one exemplary embodiment of a method for depicting the virtual object in the AR display device.

FIG. 3 shows this sequence in such an exemplary embodiment of the method according to embodiments of the invention in a schematic depiction.

The method begins at a measurement time with method step 1 and method step 2. In method step 1, the position calculation unit 40 is used to output the position DP, detected during the measurement time, of the real object RO. In method step 2, the validation apparatus 30 is used to output the position GP, estimated at the same measurement time, of the real object RO.

In a method step 3, the evaluation unit 18 is used, as already mentioned, to determine the reliability value ZW or the plausibility value using the detected and estimated position of the real object RO.

In method step 4, it is then checked whether the reliability value ZW lies above a previously defined limit value GW that is able to be set according to the application.

If the reliability value ZW lies below the limit value GW, then method step 5 is progressed to and the virtual object VO is no longer shown in the display of the AR display device 20. The tracking is in this case interrupted for example by the user or by the computer unit 10 of the AR system 100 itself and measures and calculates the position of the real object RO again at a subsequent measurement time.

If the reliability value ZW is higher than the limit value GW, then method step 6 is progressed to and the virtual object VO is shifted, based on the magnitude of the reliability value ZW, in the direction of the detected position DP of the real object RO in the display of the AR display device 20. The method is concluded 7 for this measurement time and begins again with method step 1 and method step 2 at the next subsequent measurement time.

The estimated position GP of the real object RO may also be interpolated between the consecutive measurement times on the basis of the previously detected and estimated position of the real object RO. For these interpolated values, a reliability value ZW may likewise be calculated between the individual measurement times and shown in the display of the AR display device 20.

The speed at which the virtual object VO is shifted in the direction of the detected position DP of the real object RO depends on the probability of the detected position DP corresponding to the estimated position GP of the real object RO. The speed, as already mentioned, thus depends on the reliability value ZW.

Figure 4:
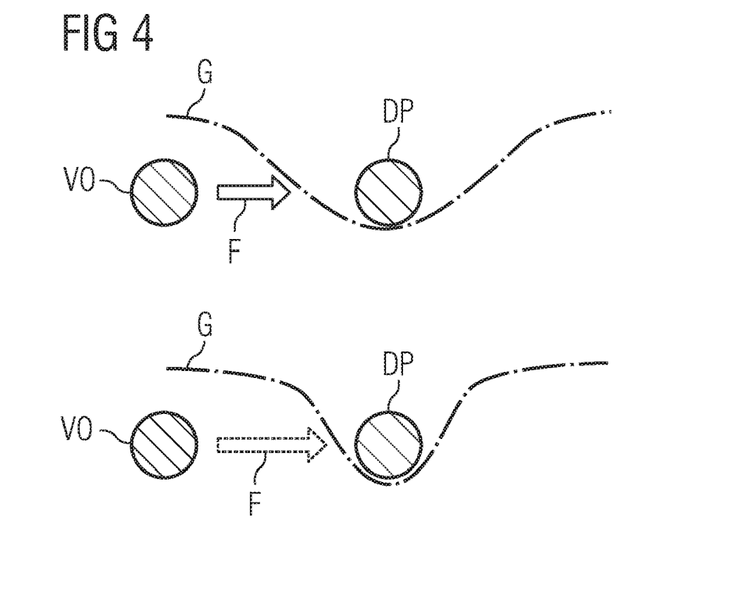
FIG. 4 shows schematic depictions for explaining one exemplary embodiment of a method for shifting the virtual object toward the detected position of the real object.

The probability of the detected position DP and the estimated position GP corresponding may for example be expressed by an (in this case inverse) Gaussian distribution, as shown in FIG. 4. Other distributions, such as for example a binomial distribution, would also be possible.

The upper illustration in FIG. 4 shows the virtual object VO and a relatively wide Gaussian bell curve G, in the peak (here the minimum) of which the detected position DP of the real object RO has the highest probability of being situated.

The lower illustration likewise depicts the virtual object VO and a Gaussian bell curve G that is narrower and steeper in comparison with the upper illustration and in whose peak the detected position DP of the real object RO again has the highest probability of being situated. The probability of the detected position DP corresponding to the estimated position GP of the real object RO is thus much higher in the lower illustration than in the upper illustration in FIG. 4.

The circumstances described for the two illustrations in FIG. 4 could also be simulated, wherein the probability distribution could for example be interpreted as a force field in which the detected position DP is drawn to the most probable position of the real object. Therefore, for the sake of clarity in FIG. 4, downwardly turned distributions were also depicted, since it is readily able to be seen from this how the ball that represents the detected position DP runs down in the potential and is thus "drawn" to the deepest point.

It would be able to be seen here that the virtual object VO on the steeper curve (from the lower illustration) is able to follow the detected position DP of the real object RO much faster than on the wider curve of the upper illustration. Therefore, the speed at which the virtual object VO is able to follow the detected position DP of the real object RO also rises with increasing probability or with increasing reliability value ZW.

The higher the reliability value ZW, the higher also the force (if the probability distribution is interpreted as a force field), which is symbolized here by the longer force arrow F, and the higher also the acceleration with which the virtual object VO follows the detected position DP.

To illustrate the speed profile during the detected and estimated position of the real object RO at the various measurement times, reference is made to FIGS. 5A-5D, which join up with one another at the skip marks x, x', x" for the sake of clarity on account of the multiplicity of intermediate steps to be explained.

FIGS. 5A-5D depicts how in each case the actual or true position of the real object RO, the estimated position GP and the detected position DP of the real object RO and the position of the virtual object VO is shown in the AR display device 20 at different times t(n+x) (where x=0.5, 1.0, 1.5, etc.).

The times in the individual steps depicted differ here in each case in steps of 0.5. This 0.5 may stand in this case for 0.5 seconds. Repeated measurements are performed for example using the tracking system TR, at regular time intervals, here every 2 seconds, in order to determine the detected position DP of the real object RO. The time interval between the measurement times may vary, and is specified by 2 seconds here only by way of example. In medical applications, a new measurement time after just 2 ms or even faster could be advantageous, for example.

Figure 5A:
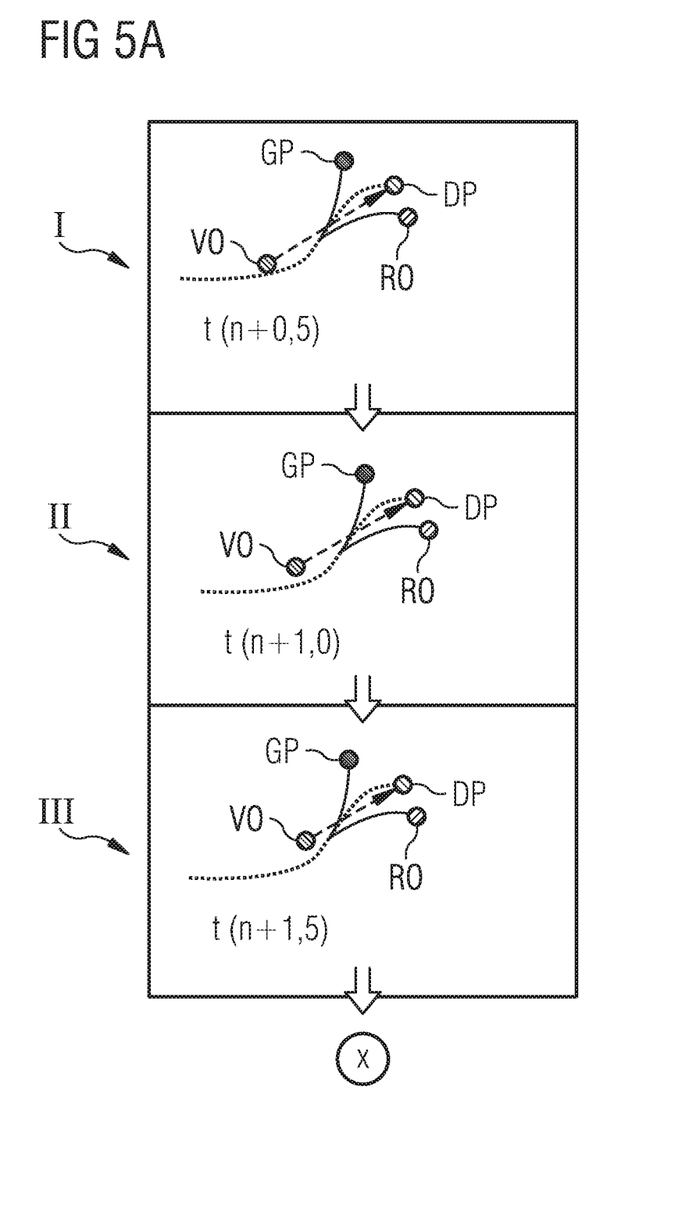
FIG. 5A schematically shows steps of execution of a sequence of an exemplary embodiment of a method for shifting the virtual object toward the detected position of the real object in the AR display device.

Step I, depicted in FIG. 5A, shows the estimated position GP and the detected position DP of the real object RO and the position of the real object RO at the time t(n+0.5), after the detected position DP of the real object RO was measured and the estimated position GP of the real object RO was calculated at a previous measurement time t(n) (not depicted here).

It is able to be seen that the virtual object VO is situated close to a trajectory of the detected position DP of the real object RO. This trajectory shows the profile of the detected positions DP of the real object RO at the previous measurement times. However, the virtual object VO nevertheless actually lies relatively far away from the current detected position DP of the real object RO. The estimated position GP of the real object RO also lies relatively far away from the current detected position DP of the real object RO, for which reason the reliability value ZW should be low here, which ultimately then correctly reflects the fact that the detected position DP lies further from the real object RO and actually does not reflect reality particularly well.

In step II, at time t(n+1.0), the virtual object VO has shifted along a marked arrow, which was also shown in step I, toward the detected position DP of the real object RO.

In step III, at time t(n+1.5), the virtual object VO has shifted even further on the directional arrow in the direction of the detected position DP of the real object RO.

Since here, as explained above, the reliability value ZW was not particularly good, the virtual object VO is thus only drawn slowly toward the current detected position DP in very small steps, which implicitly signals or shows to the user or viewer the uncertainty in the detection of the real object.

Figure 5B:
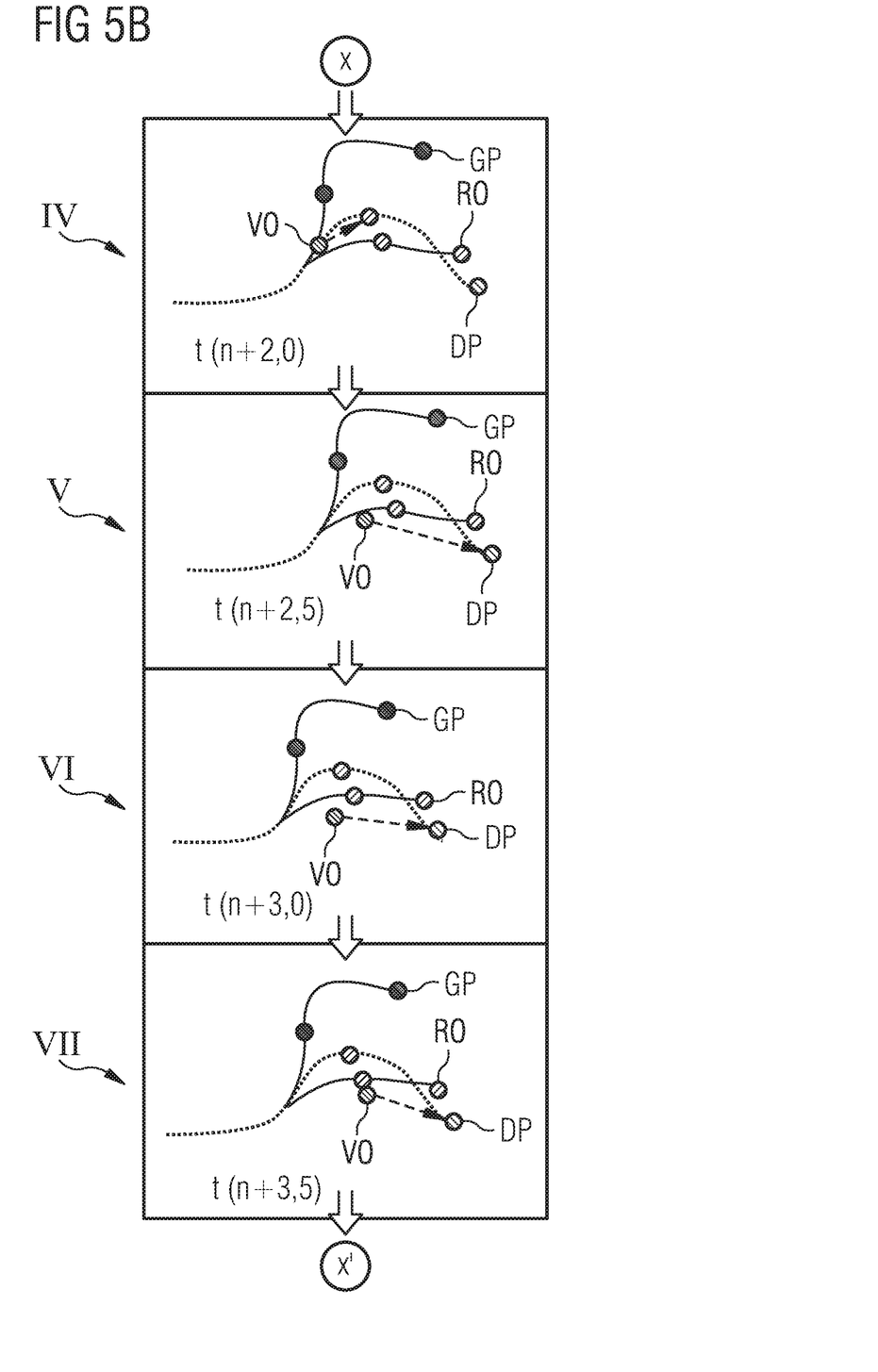
FIG. 5B schematically shows steps of execution of the sequence of an exemplary embodiment of a method for shifting the virtual object toward the detected position of the real object in the AR display device.

The time t(n+2.0) in step IV in FIG. 5B corresponds to a second measurement time, at which for example a tracking system TR is used to measure a new detected position DP of the real object RO and to calculate a new estimated position GP of the real object RO. In addition, the new actual position, changed in the time interval, of the real object RO is able to be seen. At this measurement time, the estimated position GP of the real object RO and the detected position DP of the real object RO are even further from one another than at the first measurement time. The virtual object VO in this case still follows the position DP, detected at the first measurement time, of the real object RO.

Only in step V at time t(n+2.5) does the virtual object VO then follow the detected position DP, determined at the second measurement time t(n+2.0), of the real object RO.

In step VI at time t(n+3.0), the virtual object VO has shifted even further in the direction of the detected position DP of the real object RO. The detected and estimated positions of the real object RO now lie further from one another than at the first measurement time. Therefore, the virtual object is now shifted even more slowly toward the detected position DP of the real object RO than in the previous time steps that contain the detected position DP and the estimated position GP at the first measurement time.

In step VII at time t(n+3.5), the virtual object VO has again moved another step in the direction of the detected position DP of the real object RO. However, it still does not yet reach the detected position DP of the real object RO and is still further away from the position of the detected position DP of the real object RO than at the first measurement time.

Figure 5C:
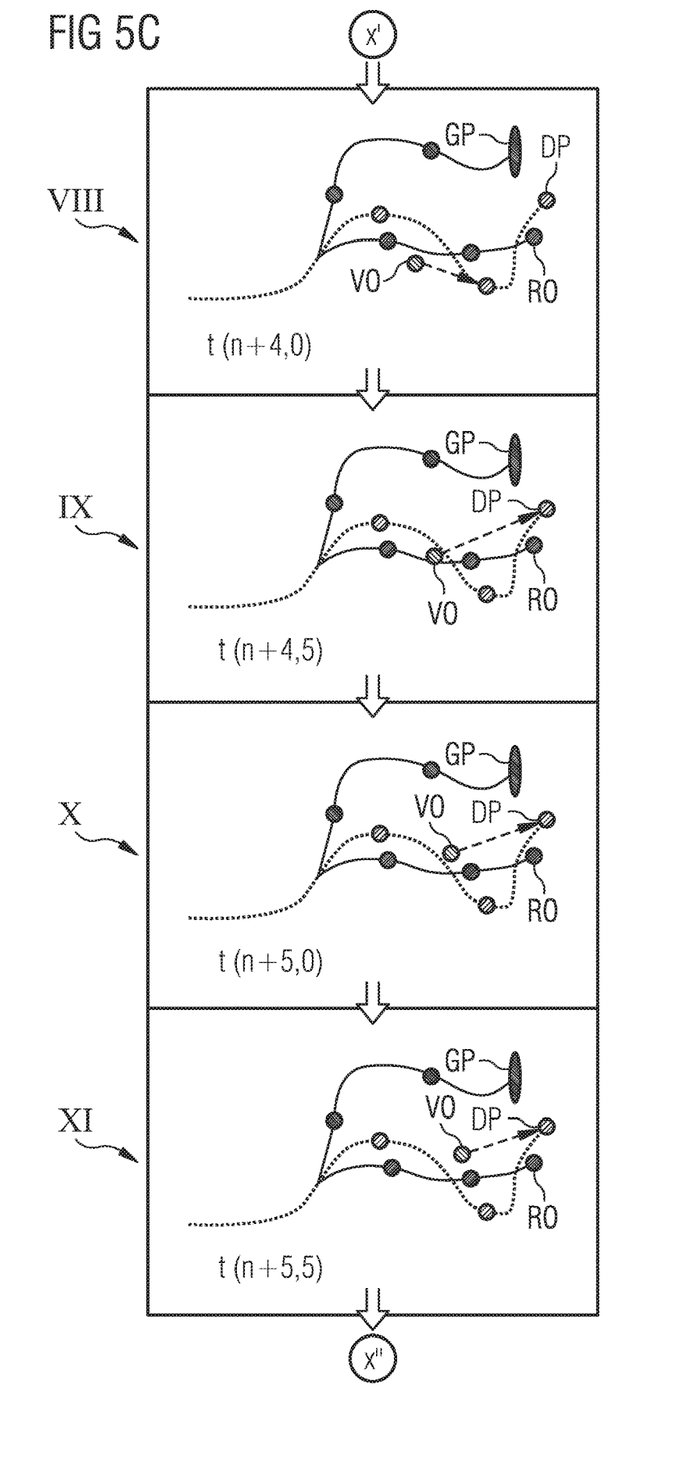
FIG. 5C schematically shows steps of execution of the sequence of an exemplary embodiment of a method for shifting the virtual object toward the detected position of the real object in the AR display device.

At a third measurement time at time t(n+4.0), in step VIII in FIG. 5C, a position of the real object RO is detected again and an estimated position GP of the real object RO is calculated.

As is able to be seen here, the estimated position GP of the real object RO may also specify a spatial region instead of just a single position, for example in the form of a point. This region comprises for example all positions that are able to be reached on the basis of the kinematics of the real object RO.

Furthermore, in step VIII, a new position of the real object RO is also depicted. The virtual object VO here again still tracks the detected position DP of the real object RO that was determined at the second measurement time t(n+2.0). The estimated position GP, the detected position DP and the actual position of the real object RO are closest to one another here in comparison with the first and second measurement time. Therefore, the reliability value ZW based on the detected and estimated position is also higher than at the previous measurement times. The virtual object VO then accordingly follows the detected position DP of the real object RO at a higher speed than in the previous steps that illustrated the detected position DP and estimated position GP of the real object RO at the first and second measurement times.

In step IX, at time t(n+4.5), the virtual object VO then tracks the position DP, detected at the third measurement time t(n+4.0), of the real object RO.

In step X, at time t(n+5.0), the virtual object VO has shifted even further in the direction of the detected position DP of the real object RO.

In step XI, at time t(n+5.5), the virtual object lies close to the detected position DP of the real object RO, but the virtual object VO does not yet reach the detected position DP. The distance between the virtual object VO and the detected position DP of the real object RO is however in this case smaller than at the first and second measurement times, as the estimated position GP of the real object RO and the detected position DP of the real object RO likewise lie closer to one another, and the reliability value ZW based on these positions of the real object RO is therefore also higher than at the first and second measurement times. The virtual object therefore now follows the detected position DP of the real object RO at a higher speed in comparison with the steps during the first, second and third measurement times.

Figure 5D:
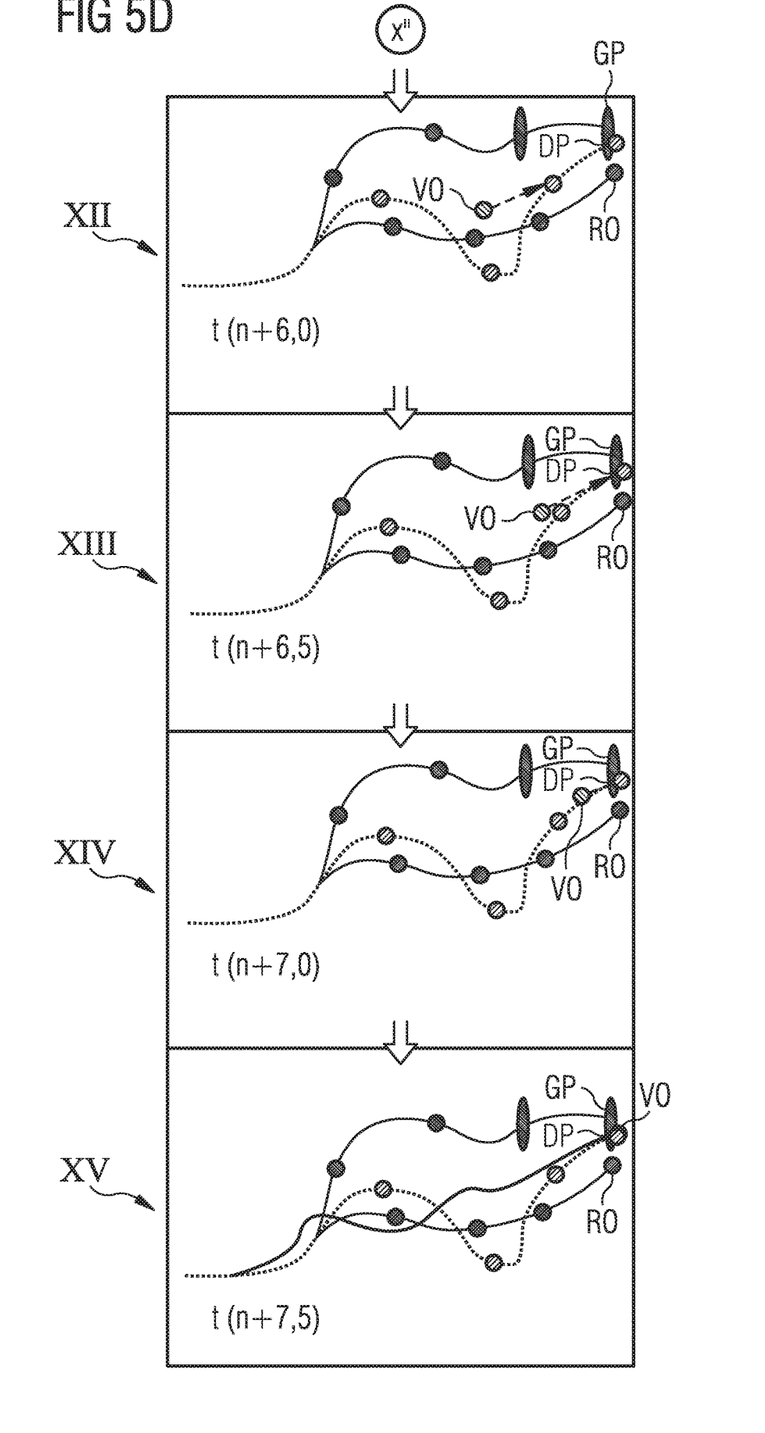
FIG. 5D schematically shows steps of execution of the sequence of an exemplary embodiment of a method for shifting the virtual object toward the detected position of the real object in the AR display device.

At the subsequent fourth measurement time, in step XII in FIG. 5D at time t(n+6.0), the newly detected position DP of the real object RO and the newly estimated position GP of the real object RO are situated in one region and even overlap one another. The true position of the real object RO and the detected position DP of the real object RO also actually lie very close to one another. The virtual object VO still tracks the detected position DP of the real object RO from the third measurement time.

In step XIII at time t(n+6.5), the virtual object VO tracks the detected position DP of the real object RO.

In step XIV at time t(n+7.0), the virtual object VO has moved relatively close to the detected position DP of the real object RO.

In step XV at time t(n+7.5), the virtual object VO reaches the detected position DP of the real object RO, since the estimated position GP and the detected position DP are situated almost at the same position in space and the reliability value ZW therefore lies approximately at 100%.

The method according to embodiments of the invention thus makes it possible to depict a virtual object VO, which is linked to a real object RO, in a display of an AR display device 20, and to display the plausibility of this position continuously in the display of the AR display device 20 by way of a reliability value ZW or to show it in another way (for example such as shown above by the tracking speed of the virtual object). In addition, the method makes it possible to show the virtual object VO by way of an additionally estimated position GP of the real object RO in the display of the AR display device 20, even though the position of the real object RO is not able to be detected.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for determining a position of a real object and displaying a virtual object linked to the real object in an augmented reality display device, the method comprising:
   detecting a position of the real object at different consecutive measurement times;
   calculating an estimated position in each case for the different consecutive measurement times; and
   determining a reliability value on a basis of the detected position of the real object and of the estimated position of the real object and shown in the augmented reality display device, wherein the estimated position is calculated using a plurality of motion parameters, the plurality of motion parameters being based on kinematics or dynamics of the real object and a guide structure that is coupled to the real object that takes into account a degree of freedom of the real object and the guide structure, wherein the degree of freedom used to calculate the estimated position of the real object depends on the detected position of the real object and a current position of the guide structure which is determined by sensors attached to the guide structure; and
   displaying a result of determining the reliability value, to the user.

2. The method as claimed in claim 1, wherein markers are used in the augmented reality display device to show the reliability value.

3. The method as claimed in claim 1, wherein, to show the reliability value, the virtual object is shifted toward the detected position of the real object in the augmented reality display device depending on the reliability value.

4. The method as claimed in claim 3, wherein the virtual object is shifted toward the detected position of the real object in the augmented reality display device when the reliability value lies above a defined first limit value.

5. The method as claimed in claim 4, wherein, to show the reliability value, the virtual object is shifted toward the estimated position of the real object in the augmented reality display device when the position of the real object is not able to be detected, which takes place only under a condition that the reliability value lies above a defined second limit value during a defined number of previous, consecutive measurement times, further wherein the second limit value is higher than the first limit value.

6. The method as claimed in claim 3, wherein a speed at which the virtual object is shifted toward the detected position of the real object is based on the reliability value.

7. The method as claimed in claim 1, wherein the virtual object comprises at least one of the following objects:
   a symbol;
   a virtual depiction of the real object; and
   an item of information relating to the real object.

8. The method as claimed in claim 1, wherein the estimated position is calculated with consideration to error reduction methods.

9. The method as claimed in claim 8, wherein the error reduction methods comprise a Kalman filter.

10. The method as claimed in claim 1, wherein the position of the real object is detected by way of a camera, and/or wherein the position of the real object is detected by way of markers that are connected to the real object and/or to the guide structure that is coupled to the real object.

11. A computer program product, comprising a computer readable hardware storage device having computer readable program code stored therein, said program code executable by a processor of a computer system to implement a method as claimed in claim 1.

12. A non-transitory computer-readable medium on which program sections able to be read and able to be executed by a computer unit are stored in order to execute all of the steps of the method as claimed in claim 1 when the program sections are executed by the computer unit.

13. An augmented reality system having an augmented reality display device for displaying a real object and a virtual object linked to the real object, wherein the augmented reality system comprises a computer unit that in each case calculates an estimated position of the real object at different consecutive measurement times, and an evaluation unit that determines a reliability value on the basis of the estimated position and of a detected position of the real object and ensures that the reliability value is shown in the augmented reality display device; wherein the estimated position is calculated using a plurality of motion parameters, the plurality of motion parameters being based on kinematics or dynamics of the real object and a guide structure that is coupled to the real object that takes into account a degree of freedom of the real object and the guide structure, wherein the degree of freedom used to calculate the estimated position of the real object depends on the detected position of the real object and a current position of the guide structure which is determined by sensors attached to the guide structure.

* * * * *